Sept. 30, 1969  K. SILVON  3,469,610

TOP SHARPENABLE SAW CHAIN

Filed Oct. 21, 1966  2 Sheets-Sheet 1

KAY SILVON
INVENTOR

BY
BUCKHORN, BLORE, KLARQUIST & SPARKMAN
ATTORNEYS

Sept. 30, 1969     K. SILVON     3,469,610
TOP SHARPENABLE SAW CHAIN
Filed Oct. 21, 1966     2 Sheets-Sheet 2
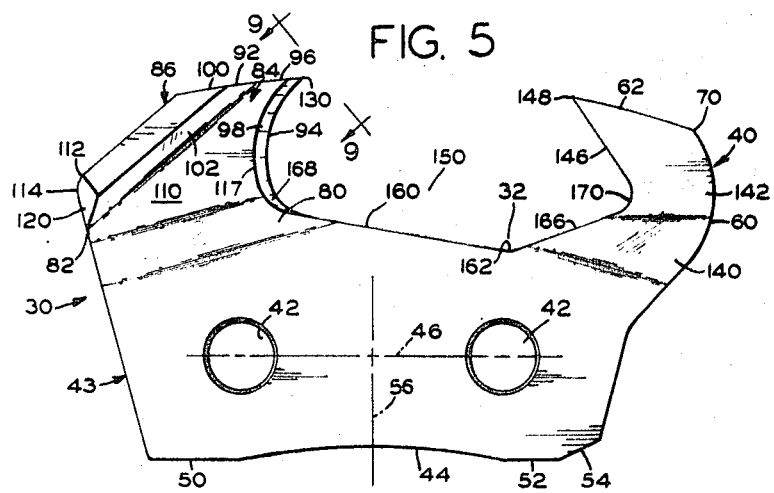
KAY SILVON
INVENTOR
BY
BUCKHORN, BLORE, KLARQUIST & SPARKMAN
ATTORNEYS

3,469,610
TOP SHARPENABLE SAW CHAIN
Kay Silvon, Portland, Oreg., assignor to Omark Industries, Inc., Portland, Oreg., a corporation of Oregon
Filed Oct. 21, 1966, Ser. No. 588,429
Int. Cl. B27b *33/14, 17/00*
U.S. Cl. 143—135                                                13 Claims

ABSTRACT OF THE DISCLOSURE

A top sharpening saw chain has cutter links each having a steeply sloping top plate having a hard chromium plating on its forward face only, a side plate having a hard chromium plating on its outer face only and a deep gullet formed by a sloping forward edge of the side plate, a sloping top edge of the body and a sloping rear edge of the depth gauge. The cutter links are allochiral and guard links are positioned in the chain so that each guard link is on the same side of the chain as the side plate of the immediately preceding cutter link.

DESCRIPTION

This invention relates to a top sharpenable saw chain, and more particularly to a lightweight saw chain which can be automatically sharpened while on a chain saw and can be easily sharpened by hand filing.

A saw chain which can be top sharpened and which is very efficient is disclosed and claimed in my Patent 3,263,717. It has been found that, by forming hard chromium platings on the cutter teeth of the chain which is of steel, very strong, tough and durable cutting edges are provided. However, when the cutter teeth are sharpened by a file as is necessary when the saw chain is used on a chain saw not having an abrading sharpener mounted thereon, the cutter teeth which are plated with chromium make the filing very difficult and rapidly dull the file. It would be desirable to provide a saw chain having the strong, tough, durable, very hard cutting edges which can be easily filed without excessive dulling of the file. It has also been found to be desirable in a saw chain of the type described above to have a deep gullet for chip clearance and to minimize weight, but hitherto this has been impossible without excessive weakening of the cutter links. Other problems in such chains solved by the present invention have been a tendency to gouge the kerf side wall, and the rear ends of the top plates of the cutter links have tended to strike or hammer the center drive links when the chain heats and elongates to form slack on the chain saw, which causes jackknifing of the links as the links leave the drive sprocket, and hitherto it has not been known how to avoid such gouging and hammering without weakening the saw chain. A further problem solved by the present invention is that of reduced chip clearance and impaired chip flow when guard links are included in the saw chain.

An object of the invention is to provide an improved top sharpenable saw chain.

Another object of the invention is to provide a lightweight saw chain which can be automatically sharpened while on a chain saw and can be easily sharpened by hand filing.

A further object of the invention is to provide a cutter link of a saw chain in which the cutter link has a sloping top plate of steel which is surface hardened only on the bottom face thereof so that the forward edge can be filed easily to form a hard, tough, durable cutting edge at the juncture of the forward edge and the bottom face.

Another object of the invention is to provide a cutter link for a saw chain in which cutter link there is a top sharpenable cutter with an extreme laterally and forwardly positioned sharp corner or point and a depth gauge positioned forwardly of the point and laterally offset from the body of the link to prevent gouging of the kerf side wall by the point of the cutter.

Yet another object of the invention is to provide a saw chain having a cutter link provided with a deep gullet having a forwardly and inwardly inclined edge at the rear and bottom of the gullet to impart strength to a top sharpenable cutter tooth at the rear of the link.

A further object of the invention is to provide a saw chain having allochiral cutter links positioned alternately on opposite sides of the saw chain with guard links positioned between each adjacent pair of cutter links and on the same side of the chain as the cutter link immediately forward to provide a long, unobstructed path for chips.

Yet another object of the invention is to provide a saw chain having a cutter link provided with a sloping, top sharpenable top plate carried at one side edge by a side plate with the rear edge of the top plate extending forwardly and transversely of the saw chain to provide clearance relative to an immediately following center drive link to prevent contact therebetween when the links fold or jackknife when coming off a drive sprocket or a roller nose of a saw bar of the chain saw.

The invention provides a cutter link for a saw chain, the cutter link having a body and a cutter tooth including a shank, a side plate carried by the shank and a top sharpenable, sloping top plate inclined forwardly and outwardly and sharpenable at the top, forward edge portion thereof to form a top cutting edge at the juncture of the forward edge portion and the bottom face of the top plate. Preferably the top plate is of steel surface hardened or coated with a hard metal only at the bottom face thereof so that the forward edge portion is easily filed while the top cutting edge is hard and durable. Preferably there is provided a depth gauge which is offset laterally from the body sufficiently to be near the kerf side wall to reduce any tendency of the laterally and forwardly extreme corner or point of the top cutting edge to gouge. The cutter link preferably has a deep gullet to provide chip clearance space and make the link as light as possible and, to provide strength to the link, the bottom edge of the gullet starts high on the link and is inclined forwardly and inwardly. The lower, rear edge of the top plate preferably extends forwardly and laterally of the saw chain to provide clearance for the immediately following drive link which may be notched at its top to add to the clearance. The saw chain also preferably has a plurality of guard links with each guard link positioned on the same side as each immediately preceding cutter link to provide a long chip clearance path.

A complete understanding of the invention may be obtained from the following detailed description of a saw chain forming one embodiment, when read in conjunction with the appended drawings, in which:

FIGS. 5 and 6 are enlarged, side elevation views of a cutter link of the saw chain of FIG. 1;

FIG. 7 is an enlarged top plan view of the cutter link of FIGS. 5 and 6;

FIG. 8 is an enlarged, fragmentary, partially sectional, front elevation view of the cutter link of FIGS. 5 and 6; and FIG. 9 is an enlarged view taken along line 9—9 of FIG. 5.

Figure 1:
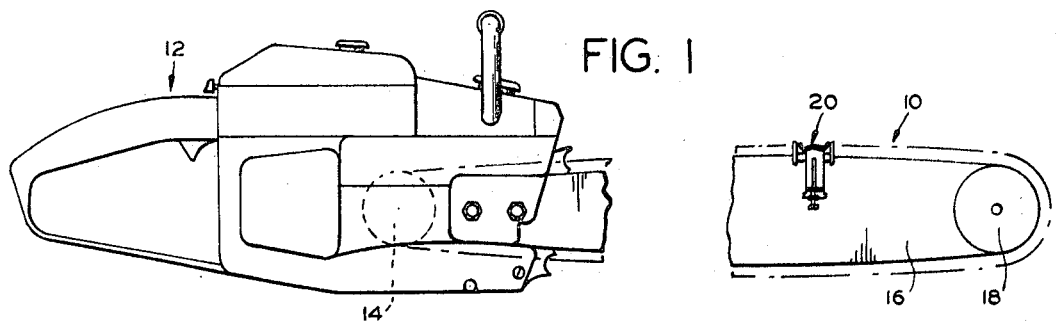
FIG. 1 is a fragmentary, side elevation view of a chain saw having thereon a saw chain forming one embodiment of the invention.

Referring now in detail to the drawings, there is shown therein a saw chain 10 forming one embodiment of the invention and mounted on a chain saw 12 (FIG. 1) having a drive sprocket 14 and a peripherally grooved saw bar or guide 16 provided with a roller nose 18. A combined file guide and gauge 20 for guiding a file 22 (FIG. 4) to top sharpen the saw chain is shown mounted on the saw bar. The saw chain 10 is well suited for general purpose sawing operations including bucking, notching and limbing, and also is well suited for cutting brush. The saw chain may be easily sharpened either by grinding or filing while on the saw or on a sharpening fixture, does not rapidly dull files used to sharpen it, has voluminous chip clearance and is light in weight and strong.

Figure 2:
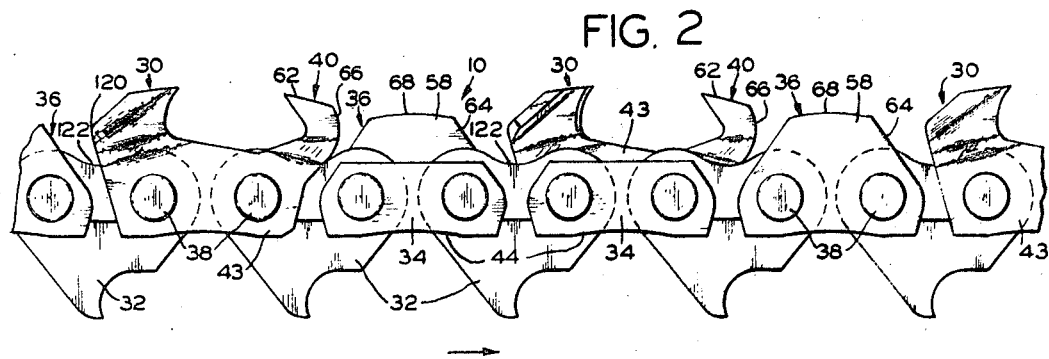
FIG. 2 is an enlarged, fragmentary, side elevation of the saw chain of FIG. 1.
Figure 3:
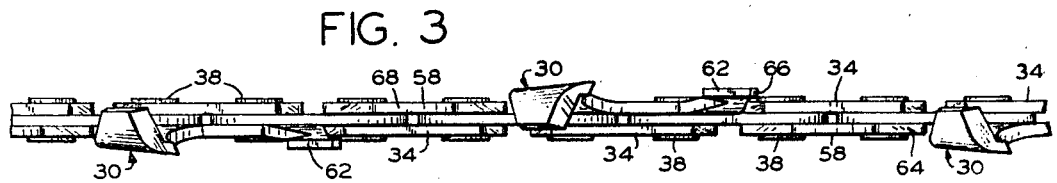
FIG. 3 is an enlarged, fragmentary, top plan view of the saw chain of FIG. 1.

The saw chain 10 (FIGS. 2 and 3) includes allochiral cutter links 30 mounted alternately on opposite sides of center drive links 32 with side positioned, tie links 34 and side positioned, camming or guard links 36. Rivets 38 secure the links pivotally together. Each cutter link is opposite one of the tie links 34, and each guard link is mounted directly behind and on the same side of the chain as the cutter link immediately preceding that guard link. This positions each guard link on the opposite side of and immediately ahead of the next cutter link, a depth gauge 40 of which is kept clear by the guard link of small twigs and the like in brush cutting operation. By locating each guard link on the same side of the chain as the immediately preceeding cutter link, a very large or voluminous chip clearance space is provided behind each cutter link which is very useful for general purpose sawings such as, for example, notching and bucking. The rivets extend through rivet holes 42 (FIG. 5) in the several links to pivotally connect the links, the rivet holes 42 of each cutter link being in a body 43 thereof. Each link preferably is of steel.

Each of the links 30, 34 and 36 has on its bottom edge a central concavely arcuate portion 44 coextensive with an imaginary line 46 joining centers 48 of the rivet holes and joined at its ends by bottom guide lands or edges 50 and 52 which lie in the same plane. The forward land 52 of the cutter links joins a beveled or sloping edge 54. An imaginary line 56 dividing the arcuate portion into two equal parts and also dividing the line 46 into two equal parts and at right angles or to the line 46 passes through the center of the drive sprocket 14 (FIG. 1) while the link 30 shown in FIG. 5 travels around the drive sprocket. The arcuate portion 44 is of a radius at least as great as the distance therefrom to the center of the drive sprocket 14 (FIG. 1) when the link 30 shown in FIG. 5 is on the drive sprocket. Each guard link 36 (FIG. 2) has a raised portion 58 extending far above a top edge 60 of each tie link 34 and positioned somewhat below a top surface 62 of each depth gauge 40. The guard link 36 has an upwardly and rearwardly sloping front edge portion 64 for camming brush upwardly so that the brush does not catch under an arcuate forward edge 66 of the following depth gauge 40. A top edge 68 of the guard link keeps the brush raised, after the edge portion 64 raises the brush, until the brush reaches the rearwardly and upwardly sloping outer portion of the forward edge 68 of the depth gauge.

Each cutter link 30 (FIGS. 5 to 9) is a one-piece member formed from sheet metal and includes, in addition to the flat or planar body 43 and the depth gauge 40, an offsetting shank 80 joining the upper or outer portion of the body to a side plate 82. A bent or rounded, narrow junction portion 84 joins a rearwardly and inwardly sloping top plate 86 to the outer, rearward edge portion of the side plate. The side plate 82, the junction portion 84 and the top plate 86 define a cutter tooth having top sharpenable stepped or offset kerf bottom cutting edges 90 and 92 and a kerf side slitting edge 94. The cutting edge 90 is defined by outer or top edge portion surface 96 of the forward portion of the side plate 82 and beveled, rearwardly and inwardly sloping forward edge surface 98 of the side plate. The cutting edge 92 is defined by outer or top edge surface 100 of the top plate 86 and a rearwardly and inwardly sloping inner or bottom face 102 of the top plate. The cutting edge 94 is defined by the forward edge surface 98 of the side plate and a flat or planar side face 104. The surfaces 96 and 100 are substantially coplanar and form a top sharpenable surface, which, when ground or filed, sharpens the cutting edges 90 and 92.

To provide ease of sharpening and prevent rapid dulling of files while making the cutting edges 90, 92 and 94 very sharp, tough and durable, the cutter link 30, including the side plate 82 and the top plate 86, is composed of steel, preferably of a hardness of about 55 on the Rockwell "C" scale. Selective portions of its surface are hardened to provide a surface layer or skin substantially harder than the interior or body portions of the link, preferably to a hardness of about 70 on the Rockwell "C" scale. The very hard surface layer or skin formed on selected areas of the cutter link 30 may be formed by carburizing the desired surface portions or by plating these areas with chromium. When chromium plating is used to provide the very hard layer, the chromium is preferably of a thickness of from .0003 inch to .001 inch. The face 104 and oppositely disposed, laterally inward face 110 of the side plate are hardened at the surface portions thereof to form hard, tough, durable surfaces, the surface 104 forming the cutting edge 94. Similarly, the inner, forward face 102 is hardened, as, for example, by plating, to form the hard, tough, durable cutting edge 92. The outer, rearward face 112 of the top plate and the upper portion of the adjacent rounded external surface 114 of the junction portion 84 are not surface hardened, and where chromium plating is used for the selective hardening, are masked during the chromium plating of the surfaces 102, 104 and 110. Hence, the face 112 and upper portion of the surface 114 are not so hard, whereby the adjacent portions of the surfaces 96 and 100 are easily filed and without dulling the file. When the surfaces 96 and 100 are filed to sharpen the edges 90 and 92, the file engages only the less hard metal or steel except for the edge 92, an edge 115 being substantially less hard. However, the very hard edge 92 is at the under side or face 102 of the top plate and is pressed away from the interior of the top plate 86, which permits ease of filing without appreciably dulling the portions of the file engaging the edge 92. When the edge surface 98 is filed with a cylindrical file, the file is moved in a direction proceeding from an obtuse corner 117 formed by the edge surface 98 and the face 110 of the side plate 82, that is, by moving the file from left to right, as viewed in FIG. 8. This makes the edge 94 sharp, tough and durable without appreciably dulling the file, and while the filing is easy.

As best shown in FIGS. 5 and 7, a rear edge 120 of the top plate 86 extends, proceeding from the junction portion 84, forwardly and across the centerline of the saw chain 10, slightly beyond the far side of the center drive links 32. This relief of the rear end of the top plate provides clearance to prevent the rear edge 120 from striking the center drive link immediately therebehind when these links pivot just before they come off the drive sprocket 14 and the nose roller 18. This clearance is increased by providing outer or top notches 122 (FIG. 2) in the central, outer portions of the center drive links, which notches are in the paths of the rear edges 120 of the top plates. This construction completely eliminates hammering even when the saw chain is quite loose on the drive sprocket, roller nose and saw bar 16. The angle defined by the edge 120 and a plane perpendicular to the centerline of the saw chain preferably is at least five degrees. This construction, while providing the clearance, also leaves the junction portion 84 long so that the top plate is strongly supported even when the surface 100 is ground down as far as a line 107 (FIG. 7).

The top plate 86 (FIG. 5) extends rearwardly and inwardly at an angle preferably of about 40° to the pitch line or centerline of the saw chain which may be considered to be the line 46 extended. To make the cutting edge 92 slope rearwardly and inwardly from the end thereof adjacent the side plate 82, the top plate 86 is tilted slightly outwardly or upwardly relative to the perpendicular to the almost vertical side plate 82 as best shown in FIG. 9, one suitable inside angle between the top plate and the side plate being about 98°. The side plate 84 (FIG. 7) to provide side clearance behind the side slitting edge 94, forms an angle with the centerline of the chain of preferably about 5°30′. The horizontal inclination of the side plate 82 relative to the centerline of the chain is about 3°. The side plate 82 (FIG. 8), while being described above as being vertical, actually is about 3° off vertical and slopes slightly laterally or sidewise of the chain to the left proceeding downwardly from the top edge portion of the side plate. This provides clearance for the inner portions of the edge 94 so that the uppermost or outermost portion of the edge 94 adjacent a sharp corner or point 130 is the only portion of the edge 94 normally effective in cutting the side wall of the kerf and in engagement with the side wall of the kerf.

The depth gauges 40 (FIG. 5) are somewhat hook-shaped, and each depth gauge includes a forwardly and outwardly extending shank portion 140 extending from the forward outer corner portion of the body and offset laterally or sidewise of the body 43 as shown in FIG. 8. Each depth gauge also includes an outer plate 142 which is substantially parallel to the side plate 82. The face 144 is substantially parallel to and is spaced laterally inwardly from the face 104 preferably from .015 to .020 inch. This close spacing of the face 144 relative to the face 104 laterally stabilizes the cutter link to prevent gouging, and this large offset of the plate 142 from the body 43 provides voluminous chip clearance for chips from the preceding cutter link 30. The close spacing of the face 144 to the face 104 and to the adjacent side wall of the kerf also tends to prevent chips from entering and becoming trapped between the face 144 and the side wall of the kerf. A rear edge 146 (FIG. 5) of the plate 142 slopes inwardly and forwardly from a tip 148 of the depth gauge to cause the difference between the height from an extension of the line 46 to the tip or edge 148 and the height of the cutting edges 90 and 92 to be substantially constant as the surfaces 62, 96 and 100 are equally sharpened or ground down by filing or grinding and the edge 94 is sharpened by filing or grinding the edge surface 98. Some users prefer a greater height differential between the edges 90 and 92 and the edge 148, and to precisely achieve this, a line 149 (FIG. 6), which is parallel to the edge 146 and spaced a predetermined distance from the edge 146, is inscribed in the face 144 in the depth gauge, and these users file the edge 146 back to the line 149. This lowers the edge 148 relative to the edges 90 and 92.

To provide a deep gullet 150 for chip clearance and for minimizing the weight of the cutter link 30 while keeping the portions of the cutter link supporting the cutter tooth strong, an upper edge 160 of the shank 80 and the body 43 slopes forwardly and inwardly from substantially the side plate 82 to a blending edge portion 162 substantially directly above forward rivet hole 42 joining the edge 160 to forwardly and slightly outwardly sloping edge portion 166 of the shank 140. This makes the gullet 150 deep while making the support of the side plate 82 strong. The portion of the body 43 between the rear rivet hole 42 and the edge 160 is very wide and therefore strong, it having been found that the greatest tendency of the links of the general type of the link 30 to break was previously in the portion from the rear rivet hole to the gullet. The distance from the rear rivet hole to the edge 160 preferably is almost twice the distance from the rivet holes in the tie links to the upper edges of the tie links. An arcuate transition portion 168 joins the edges 98 and 160 and an arcuate transition portion 170 joins the edges 146 and 166.

Figure 4:
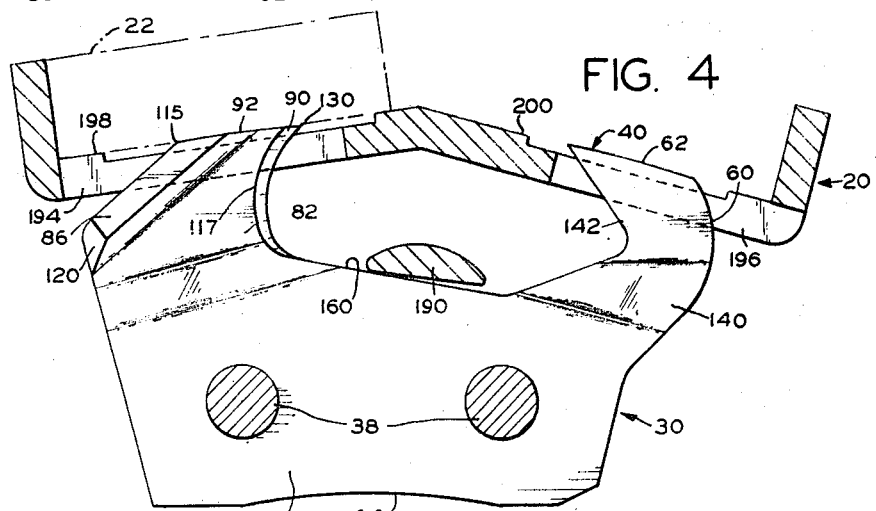
FIG. 4 is an enlarged, fragmentary, partially sectional, side elevation view of a cutter link of the saw chain of FIG. 1 with a file guide in position to guide a file in sharpening the link.

The cutting edges 90 and 92 may be sharpened and the depth gauge 40 reduced in height by top sharpening, which may be effected either by grinding in which an abrasive member is brought into engagement with the surfaces 62, 96 and 100 as the cutter link 30 is advanced along a curved path such as, for example, the drive sprocket 14 or nose roller 18, or by filing the surface 62 and the surface defined by the surfaces 96 and 100 preferably with the aid of the combined file guide and gauge 20 (FIG. 4). In sharpening by grinding while the chain is on an arcuate path, the surface 62 and the surfaces 96 and 100 are arcuate. That is, these surfaces form parts of a cylinder 171 (FIG. 6) centered on the center of the arcuate or cylindrical path of the surfaces 62, 96 and 100, as, for instance, the axis of rotation of the drive sprocket, the line 56 being a radius of the arcuate path. The line 56 is at right angles with the line 46 joining the centers of the rivet holes 42, and passes through the midpoint of the line 46. The tip 148 of the depth gauge, which is the highest and most rearward point of the surface 62, is positioned substantially farther forwardly of the midpoint of the line 4 than the greatest distance rearwardly of any part of the cutting edges 90 and 92 from the midpoint of the line 46 so that the tip 148 of the depth gauge is lower than the cutting edges 90 and 92 to provide the desired predetermined height differential, the slope and position of the edge 146 being such relative to the slopes and positions of the edge 94 and the top plate 86 that this height differential is maintained throughout the life of the saw chain as the cutter tooth and depth gauge are ground down in sharpening. The surfaces 96 and 100 slope inwardly, proceeding rearwardly from the edges 90 and 92, respectively, to provide top clearance for the cutting edges 90 and 92. As best shown in FIGS. 5 and 8, the cutting edge 90, being closer to the line 56 than the cutting edge 92, is higher than the edge 92, and, in cutting, in effect tends to cut a dado at the side of the kerf bottom which causes the edge 92 to act primarily as a raker. That is, the edges 90 and 94 act as a slitter and the edge 92 acts as a raker to provide fast, efficient cutting.

When the saw chain 10 is top sharpened by filing with the aid of the combined filing guide and gauge 20 (FIG. 4), the guide and gauge is placed on the cutter tooth with a height gauging member 190 engaging the edge 160 and a plate member 192 having openings 194 and 196 positioned over the link 30 with the tooth projecting through the opening 194 and the depth gauge 40 projecting through the opening 190. The member 192 has angular file guiding top surfaces 198 and 200 so positioned that the top surfaces 62, 96 and 100, when filed by the file 22 flush with the respective surfaces 200 and 198, will have the corrective relative slopes, top clearances and height differentials. In effect, the geometry of the sharpened link 30 will be functionally the same as if it were sharpened by grinding while on the drive sprocket 14 except that the top surfaces 62, 96 and 100 are planar rather than arcuate, the two planes including these top surfaces being slightly chordal to the cylindrical surface formed by grinding while the tooth is advanced around the drive sprocket. During the filing of the top surfaces 96 and 100, the file 22 is moved substantially transversely of the chain and the only hard surfaces encountered by the file are the cutting edge 92 and the edges of the faces 104 and 110 of the side plate 84. By keeping the face 112 the same hardness as that of the interior of the top plate, the filing is greatly facilitated and rapid dulling of the file is avoided while the edges 90 and 92 are strong, hard and tough.

To sharpen the cutting edge 94 (FIG. 5), a cylindrical file (not shown) supported by a file guiding plate (not shown) resting on the top of the cutter link 30 is moved into lateral engagement with the edge surface 98 of the side plate 82 and is pushed across the edge surface 98 to sharpen the cutting edge 94 and incidentally sharpen the cutting edge 90, a fraction of the file being above the surface 96. Preferably the file may always be moved across the edge 98 from left to right, as viewed in FIG. 8.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a top sharpening saw chain cutter link,
    a body,
    a top plate having a forward face, a rear face and an outer, forward edge surface defining a cutting edge with the forward face,
    and shank means joining the top plate to the body portion in a position in which the top plate slopes steeply rearwardly and inwardly from the outer, forward edge surface,
    the top plate being of a metal having a predetermined hardness,
    the downwardly facing forward face of the top plate having a hardness substantially greater than said predetermined hardness and the rear face of the top plate being of said predetermined hardness.

2. The top sharpening saw chain cutter link of claim 1 wherein the shank means includes a shank portion joined to the body and a side plate joined to the shank portion and one edge of the top plate,
    the side plate being of said metal of said predetermined hardness and having a laterally outward face of a hardness substantially greater than said predetermined hardness,
    the side plate also having a forward edge portion forming a side slitting edge with the laterally outward face.

3. The top sharpening saw chain cutter link of claim 2 wherein said metal is steel, the forward face and the laterally outward face being chromed and the rear face is substantially free of chromium.

4. The top sharpening saw chain link of claim 2 wherein the rear edge of the top plate extends forwardly and across the body from the side plate.

5. The top sharpening saw chain cutter link of claim 2 including a depth gauge at the forward end of the body,
    the rear edge of the depth gauge, the top edge of the body and the forward edges of the shank portion and the side plate defining a gullet,
    the deepest portion of the gullet being at the juncture of the rear edge of the depth gauge and the top edge of the body and the gullet being asymmetrical.

6. The top sharpening saw chain of claim 2 including a depth gauge at the forward end of the body,
    the rear edge of the depth gauge, the top edge of the body and the forward edges of the shank portion and the side plate forming a gullet,
    the top edge of the body sloping rearwardly and radially outwardly substantially from the forward end thereof to the rearward end thereof.

7. The top sharpening saw chain cutter link of claim 1 wherein said metal is steel, the forward face being a plating of chromium and the rear face being substantially free of chromium.

8. The top sharpening saw chain link of claim 1 wherein the top plate slopes forwardly and radially outwardly from the body and the rear edge of the top plate extends across the body and forwardly.

9. In a top sharpening saw chain,
    a plurality of center drive links,
    a plurality of side links,
    a plurality of allochiral cutter links having steeply inclined top plates provided with downwardly facing forward faces, upwardly facing rear faces and outer edge surfaces,
    each cutter link also having a body and shank means joining the outer edge of the body to the top plate thereof,
    and rivet means securing the bodies and the side links to the center drive links,
    the top plates being of steel of a predetermined hardness,
    the downwardly facing forward faces of the top plates having chromium platings thereon and the rear faces of the top plates being substantially free of chromium.

10. The top sharpening saw chain of claim 9 wherein the shank means of the cutter links include side plates joined to the top plates and shank portions joined to the side plates and bodies,
    the side plates being of steel and having laterally outward side faces and forward edges defining slitting edges,
    the laterally outward side faces having chromium platings thereon and the opposite faces thereof being substantially free of chromium.

11. The top sharpening saw chain of claim 10 including guard links each positioned on the same side of the chain as the immediately preceding cutter link and on the opposite side from the immediately following cutter link to provide a large chip clearance space between said preceding cutter link and said following cutter link.

12. The top sharpening saw chain of claim 10 wherein each top plate has a rear edge extending from the side plate forwardly and across the chain.

13. In a top sharpening saw chain cutter link,
    a body,
    a top plate having a forward face, a rear face and an outer, forward edge surface defining a cutting edge with the forward face,
    and shank means including a shank portion joined to the body and a side plate joined to the shank portion and one edge of the top plate,
    the side plate holding the top plate in a position in which the top plate steeply slopes rearwardly and inwardly from the outer, forward edge surface to form an angle of about 40° to the pitch line of the body,
    the top plate being of steel having a predetermined hardness,
    the forward, bottom face of the top plate being a plating of chromium and having a hardness substantially greater than said predetermined hardness and the rear face of the top plate being of said predetermined hardness,
    the side plate being of steel and of said predetermined hardness and the laterally outward face thereof having a chromium plating of a hardness substantially greater than said predetermined hardness, the laterally inward face of the side plate being free of chromium and being of said predetermined hardness, the side plate also having a forward edge portion forming a side slittering edge with the laterally outward face.

References Cited

UNITED STATES PATENTS

| | | | |
|---|---|---|---|
| 88,649 | 4/1869 | Machamer | 143—133 X |
| 2,791,248 | 5/1957 | Beale | 143—133 |
| 2,832,180 | 4/1958 | Carlton | 76—112 |
| 2,930,417 | 3/1960 | Consoletti | 143—135 |
| 2,974,695 | 3/1961 | Pfeffer | 143—133 |
| 3,170,497 | 2/1965 | Ehlen et al. | 143—135 |
| 3,189,064 | 6/1965 | Frederickson | 143—135 |
| 3,260,287 | 7/1966 | Oehrli | 143—32 |
| 3,263,717 | 8/1966 | Silvon | 143—135 |
| 3,308,859 | 3/1967 | Ehlen | 143—135 |

DONALD R. SCHRAN, Primary Examiner

U.S. Cl. X.R.

76—25; 143—32